July 26, 1955   J. A. HJULIAN   2,713,873
FLOAT VALVE
Filed Nov. 17, 1951
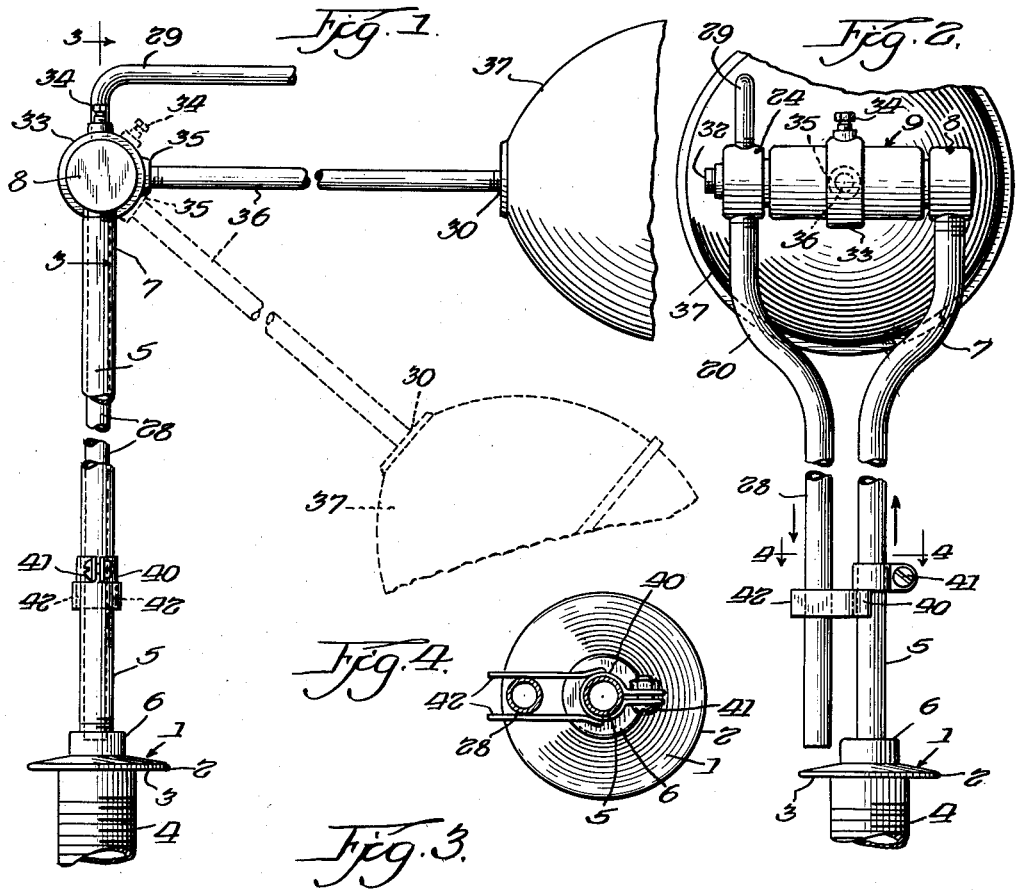
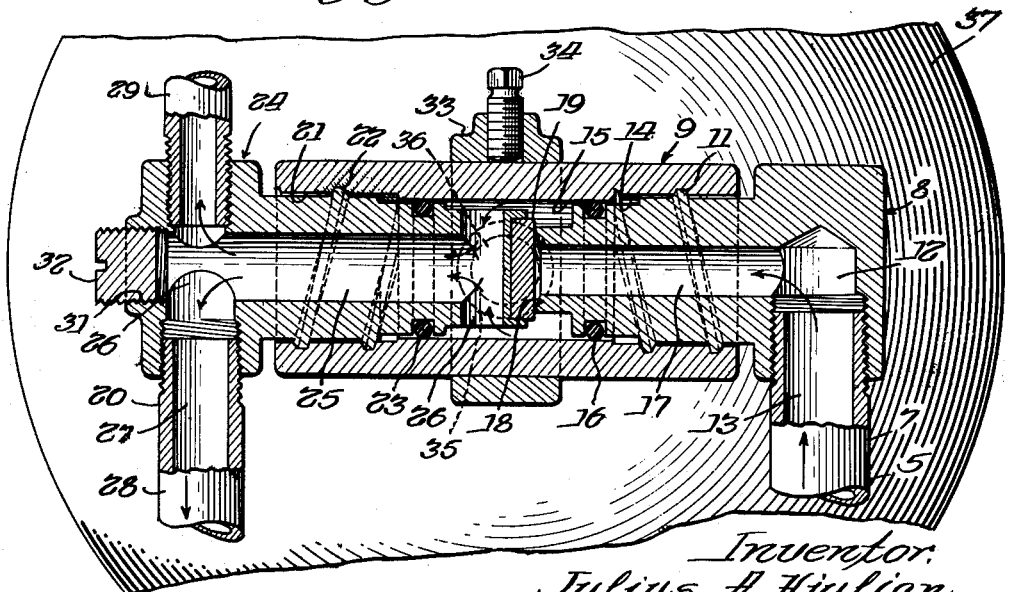
Inventor
Julius A. Hjulian
By Joseph O. Lange Atty.

United States Patent Office 2,713,873
Patented July 26, 1955

2,713,873

FLOAT VALVE

Julius A. Hjulian, Palos Heights, Ill., assignor to Crane Co., Chicago, Ill., a corporation of Illinois Application November 17, 1951, Serial No. 256,875

4 Claims. (Cl. 137—447)

This invention relates generally to a float valve, and, more particularly, it is concerned with a novel form of tank filling valve, preferably actuated by means of the pivotal movement of a float member or the like within a tank or other container.

At the outset, in connection with tank filling valves in general, it should be understood that the prior problems have stemmed from the unusual expense in connection with the manufacture and maintenance.

Accordingly, it is one of the more important objects of this invention to provide a tank filling valve which is more quiet in operation and economical to manufacture than prior constructions.

Another object is to provide for a relatively simple construction, in which the valve consists essentially of only three major members, that is two threaded members and a casing or body wherein the latter member is preferably provided with right and left-hand threaded portions at its end or outer limits engaged by a pair of tubular members, one at each end.

Another object is to provide for a structure in which one of said tubular members is provided with a seat and the other tubular member provided with a disc or closure member, preferably having an inlet supply passage therein above or beyond the closure member for discharge into a tank or the like as hereinafter described.

Another object is to provide for a relatively simple form of tank filling valve, in which the structure lends itself to relative simplicity in design, so that it may be manufactured, for example, in automatic machines from easily obtainable brass rod.

Other objects and advantages will become more readily apparent upon proceeding with the following specification read in light of the accompanying drawings, in which Fig. 1 is a side exterior view of a valve embodying my invention.

Fig. 2 is a front view of the structure shown in Fig. 1.

Fig. 3 is a sectional assembly view taken on the line 3—3 of Fig. 1.

Fig. 4 is a sectional view of a clamp employed therewith taken on the line 4—4 of Fig. 2.

Similar reference numerals refer to similar parts throughout the several views.

Referring now to Fig. 1, the valve positioning within a tank or the like container is accomplished by means of the usual floor bushing generally designated 1, having the flange 2 bearing on the surface 3 in leakproof relation against the floor or the bottom of the tank (not shown) and having the shank 4 for effecting a leakproof connection with said tank and with a source of liquid supply (not shown). An inlet standpipe 5 is threadedly or otherwise connected to the hub 6 of the floor bushing 1 in any suitable manner, the inlet standpipe 5 preferably being outwardly directed or offset, as at 7, for connection to the end fitting bearing member 8, as shown more clearly in Fig. 3. The latter member is preferably attached to the body which is a rotatably mounted tubular member and is generally designated 9. By means of the left-hand, preferably 60-degree truncated threads 11 predetermined rotatability and endwise movement of the body member 9 is provided, as hereinafter explained. The end fitting 8 of elbow form has the chamber 12 communicating with the interior 13 of the inlet supply pipe 5, as illustrated. The rotatable tubular member beyond the threaded chamber 14 is provided with a reduced bore 15 effecting a sealing surface for peripheral engagement by the O-ring 16 for the purpose of inhibiting or minimizing the backflow of fluid pressure into the chamber 14, which latter chamber is threaded as previously described, as at 11. The end fitting 8 has the transversely extending chamber 17 communicating with the chambers 12 and 13 and having its inner limits defined by an annular valve seat 18 arranged for engagement by the seating member 19 which may be of any desirable composition or of a suitable metal depending upon the nature of the service encountered.

In the opposite end limit of the rotatably mounted tubular casing 9 is the chamber 21 threaded similarly as at 22 to receive the right-hand 60-degree truncated threads as illustrated. Here, similarly, the reduced central chamber 15 of the body 9 extends through the latter member to also provide an annular bearing surface for the oppositely disposed sealing ring 23 mounted in a manner similar to that described in connection with the sealing ring 16. Receivable within the threaded end chamber 21 is the similar threaded bearing member of T-fitting configuration and generally designated 24. It has the central chamber 25 defined at its ends by the transverse passages 26, communicating with the chamber 15 at the inner end and with the transverse passage 27 at its outer end portion. The threaded bearing member 24 at the outer transverse passage 26 has a suitable connection with the passage 27 of the discharge pipe 28 normally discharging into the tank for filling purposes. In connection with plumbing flushing service on closet tanks or the like, for example, it is desirable to also provide the upper end of the threaded bearing member 24 with the transversely mounted refill tube 29 threadedly connected as indicated and which receives a portion of the flow from the passage 25. In order to machine or form the passage 25 more conveniently, it may be desirable to have an axially aligned opening therefor, as at 31, normally plugged afterward by means of the screw plug member 32.

Non-rotatably attached to the outer periphery of the tubular body member 9 is the annular clamp ring 33 which is mounted over the outer periphery of the member 9 as illustrated and is held in said non-rotatable relation therewith by means of the set screw 34 frictionally bearing against the outer surface of the member 9. As shown more clearly in Fig. 1, the clamp ring 33 is also provided with a boss 35 tapped or otherwise recessed or formed to receive the float rod 36 which, at its opposite end portion at 30, is connected to a float ball 37, as illustrated.

It will be apparent that the body or casing 9 rotates relative to the angle fitting 8, and in so rotating it will carry the fitting 24 with it, and thus cause slight rotation of the member 24 with respect to the angle fitting 8 while moving the member 24 endwise with respect to the member 8; the direction of liquid flow preferably takes place in the manner indicated by the arrows. It will thus be understood that by virtue of the pivotal movement of the tank float 37 in response to a change in liquid levels in the tank, the rod 36 will cause the clamp member 33 to be rotated together with the tubular body member 9. By reason of such rotation, in view of the pitch of the designated threads 11 and 22, the end bearing members 8 and 24 will be moved axially apart or drawn together, depending upon the direction of the rotation of the tubular member 9 in response to said rise and fall of water or other liquid within the tank. The flow within the control device or valve takes place in the manner shown by the arrows upon movement of the valve closure member 19 away from the contact shown in Fig. 3 with the valve seat 18.

As shown in Figs. 2 and 4, it will be understood that in order to obtain the rotative and axial movement referred to in connection with the members 8 and 24 relative to the body 9, the inlet and outlet vertical pipes 5 and 28 are clamped to inhibit relative rotation therebetween and yet allow for the necessary transverse movement therebetween as the member 24 moves axially toward and away from the member 8 on the threads 11 and 22 respectively. Thus, a novel clamp member 40 has been devised to fit securely on the inlet pipe 5 by means of the attaching screw 41, and having the extension 42, open-ended as shown more clearly in the sectional view of Fig. 4 to receive the discharge tubing 28. It will be clear that depending upon the direction of rotation of the body 9 upon the quick threads 11 and 22 in the change of levels in the tank, the closure member 19 will be moved toward and away from the valve seat 18 on the hollow end member 8 to allow liquid flow or stoppage thereof, as illustrated in Fig. 3, the liquid flowing initially past the closure member seating face and thence around it to enter the inner transverse passage 26 and thence into central axial passage 25. It will be further apparent that as the ball float 37 drops after the tank or container within which it is mounted has emptied (dotted lines of Fig. 1) the rotative movement of the body 9 on the threads 11 and 22 will cause the disc or closure member 19 to break contact at seat 18, thereby to fill or replenish the tank, as desired, through the filler tube 28. With the tank liquid level attained, the pipes 5 and 28 will be drawn together and assume the closed position shown in Fig. 3. Therefore, the need for an open end clamp, as at 42, in Fig. 4 will be appreciated.

Thus, it will be understood that a comparatively simple and effective ballcock or similar tank filling construction has been provided in which economy of manufacture and maintenance is a significant feature, as well as affording a structure which is both simple and positive in valve seating. While only a single embodiment has been illustrated and described, it will, of course, be clear that other forms of construction may be substituted falling within the terms of the invention as measured by the scope of the appended claims.

I claim:

1. In a float valve comprising a rotatable casing with inlet and outlet portions, a float member connected to said rotatable casing, the said casing having both end portions thereof provided with multiple threads having relatively sharp pitch, an angular form of inlet fitting member threadedly connected to the said rotatable casing at the inlet thereof, a second angular fitting connected to the said rotatable casing at the outlet portion thereof, means for connecting said float member to the said rotatable casing, an inlet standpipe supporting the first-named fitting member, and clamp means cooperating with the standpipe and said second named angular fitting to permit predetermined transverse movement therebetween while inhibiting relative angular movement of the said second named angular fitting relative to said standpipe, the said float member comprising a pivotally movable member connected to the said rotatable casing, and a closure member carried by one of the said angular fitting members to interrupt flow between said angular members upon predetermined pivotal movement of the said float member.

2. In a float valve comprising a limitedly rotatable casing with inlet and outlet portions, a float member connected to said rotatable casing, the said casing having both end portions thereof threaded, an inlet fitting member threadedly connected to the said rotatable casing at the inlet portion thereof, an outlet fitting member connected to the said rotatable casing at the other threaded portion, valve means interposed between the said fitting members forming a portion of one of said fitting members cooperating with the said fitting members for restraining relative pivotal movement between said fitting members while permitting transverse movement therebetween in a substantially single plane.

3. The subject matter of claim 2, one of said fitting members also having a refill outlet passage therefrom.

4. The subject matter of claim 2, including a substantially transverse passage extending through one of said angular fitting members beyond the valve means in the line of flow.

References Cited in the file of this patent

UNITED STATES PATENTS

| | | |
|---|---|---|
| Re. 17,115 | Russell | Oct. 23, 1928 |
| 163,263 | Schofield | May 11, 1875 |
| 251,283 | Quinn | Dec. 20, 1881 |
| 501,713 | Gold | July 18, 1893 |
| 582,911 | Frederick | May 18, 1897 |
| 668,652 | Markwick | Feb. 26, 1901 |
| 1,120,661 | Artigue | Dec. 15, 1914 |
| 1,211,876 | Price | Jan. 9, 1917 |
| 1,451,025 | Kraft | Apr. 10, 1923 |
| 1,542,406 | Pfeiffer | June 16, 1925 |
| 1,544,608 | Smith et al. | July 7, 1925 |
| 1,969,645 | Glenn | Aug. 7, 1934 |
| 2,509,671 | Christensen | May 30, 1950 |
| 2,582,616 | Wuesthoff | Jan. 15, 1952 |